(12) United States Patent
Rozman et al.

(10) Patent No.: US 8,320,090 B2
(45) Date of Patent: Nov. 27, 2012

(54) SSPC FOR PARALLEL ARC FAULT DETECTION IN DC POWER SYSTEM

(75) Inventors: Gregory I. Rozman, Rockford, IL (US); Joshua C. Swenson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 206 days.

(21) Appl. No.: 12/796,275

(22) Filed: Jun. 8, 2010

(65) Prior Publication Data
US 2011/0299201 A1 Dec. 8, 2011

(51) Int. Cl.
*H02H 3/16* (2006.01)
(52) U.S. Cl. ............................................. 361/42; 361/44
(58) Field of Classification Search ................ 361/42–50
See application file for complete search history.

(56) References Cited

U.S. PATENT DOCUMENTS

| | | | |
|---|---|---|---|
| 7,023,196 B2 | 4/2006 | Khan et al. | |
| 7,038,897 B2 | 5/2006 | Csanky et al. | |
| 7,177,125 B2 | 2/2007 | Lazarovich et al. | |
| 7,391,218 B2 | 6/2008 | Kojori et al. | |
| 7,460,346 B2 | 12/2008 | Deshpande et al. | |
| 7,489,138 B2 | 2/2009 | Yu et al. | |
| 7,723,869 B2 * | 5/2010 | Arpilliere et al. | 307/116 |
| 2006/0200688 A1 * | 9/2006 | Tofigh et al. | 713/300 |
| 2006/0215335 A1 | 9/2006 | Deshpande et al. | |
| 2007/0133134 A1 | 6/2007 | Kilroy et al. | |
| 2007/0133135 A1 | 6/2007 | Kilroy et al. | |
| 2009/0103216 A1 | 4/2009 | Oldenburg et al. | |

OTHER PUBLICATIONS

Semisouth, Data Sheet of SemiSouth Normally-OFF Trench Silicon Carbide Power JFET SJEP120R063, SemiSouth Labratories.

* cited by examiner

*Primary Examiner* — Danny Nguyen
(74) *Attorney, Agent, or Firm* — Cantor Colburn LLP

(57) ABSTRACT

A solid state power controller (SSPC) for detecting a parallel arc fault in a direct current (DC) power distribution system includes an input, the input being connected to a DC power source; a power switch connected to the input; an output connected to the power switch, the output being connected to a DC motor controller and associated capacitive load; an output current sensor; an output voltage sensor; and an SSPC controller, the SSPC controller being configured to determine the presence of a parallel arc fault in the DC power distribution system and control the power switch via a gate drive based on inputs from the output current sensor and the output voltage sensor.

17 Claims, 4 Drawing Sheets

SSPC FOR PARALLEL ARC FAULT DETECTION IN DC POWER SYSTEM

FIELD OF INVENTION

The subject matter disclosed herein relates generally to the field of solid state power controllers.

DESCRIPTION OF RELATED ART

Solid State Power Controllers (SSPCs) are used in power distribution systems in, for example, the aerospace industry, as an alternative to traditional electromechanical circuit breakers. An SSPC may distribute power to and protect various electrical loads. In comparison to electromechanical devices, SSPCs provide relatively fast response time, and may eliminate arcing during turn-off transient and bouncing during turn-on transient. SSPCs also do not suffer severe degradation during repeated fault isolation in comparison with electromechanical devices. SSPCs may be relatively small in weight and size. SSPCs facilitate advanced protection and diagnostics, allowing for efficient power distribution architectures and packaging techniques.

Parallel arc faults in a direct current (DC) power distribution system, such as an aircraft power distribution system, are a significant safety concern. Causes of parallel arc faults may include wire chafing, dust buildup, temperature extremes, moisture, and insulation breakdown. Integration of arc fault detection in the aircraft electrical systems presents significant challenges, including a lack of ground return wires, which are typically required for ground fault protection, transient load characteristics, and zero-tolerance for nuisance trips.

BRIEF SUMMARY

According to one aspect of the invention, a method for detecting a parallel arc fault by a solid state power controller (SSPC) in a direct current (DC) power distribution system includes determining whether an output current slew rate from an output current sensor of the SSPC is above an output current slew rate threshold, and, in the event the output current slew rate is above the output current slew rate threshold: setting a power switch of the SSPC to saturation at a current limit; and determining whether an output voltage of the SSPC is above an output voltage threshold, and, in the event the output voltage is above the output voltage threshold: enabling pulse width modulation of the power switch; and determining whether an output voltage waveform and a output current waveform of the SSPC are consistent with a capacitive load attached to an output of the SSPC, and, in the event the output voltage waveform and the output current waveform are not consistent with the capacitive load: issuing a parallel arc fault status; and turning off the power switch.

According to another aspect of the invention, a solid state power controller (SSPC) for detecting a parallel arc fault in a direct current (DC) power distribution system includes an input, the input being connected to a DC power source; a power switch connected to the input; an output connected to the power switch, the output being connected to a DC motor controller and associated capacitive load; an output current sensor; an output voltage sensor; and an SSPC controller, the SSPC controller being configured to determine the presence of a parallel arc fault in the DC power distribution system and control the power switch via a gate drive based on inputs from the output current sensor and the output voltage sensor.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of an SSPC for parallel arc fault detection in a DC power distribution system and a method of parallel arc fault detection are provided, with exemplary embodiments being discussed below in detail. SSPC technology may be applied to DC electrical power distribution systems, and more specifically to a method and apparatus for detecting parallel arc faults control in DC power distribution systems that employ motor controllers. Use of an SSPC in an aircraft electrical distribution system may facilitate incorporation of parallel arc fault protection of SSPC-fed circuitry and loads.

Figure 1:
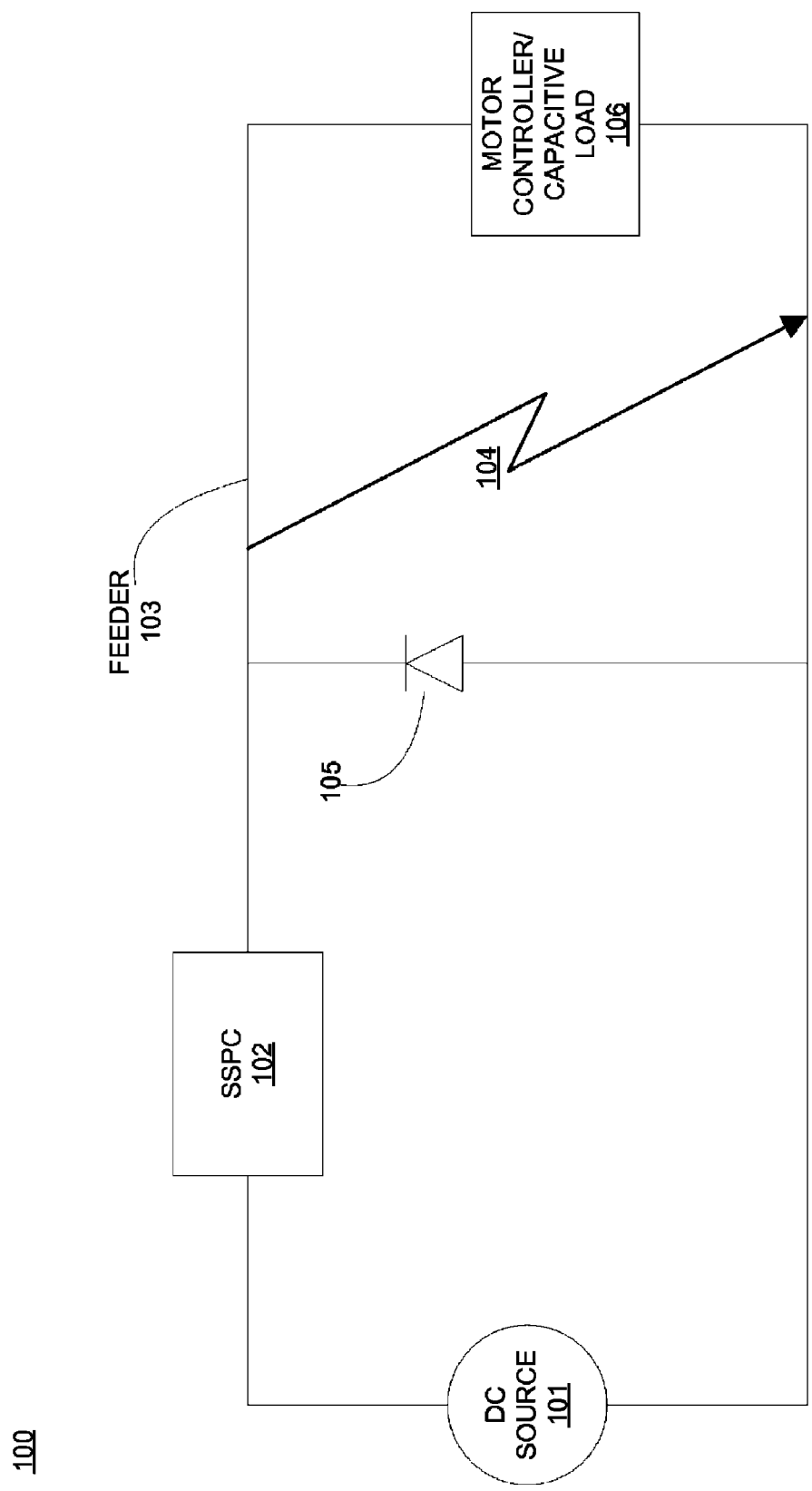
FIG. 1 illustrates an embodiment of a DC power distribution system with a parallel arc fault.

FIG. 1 illustrates an embodiment of a DC power distribution system 100 with a parallel arc fault 104. DC power distribution system 100 comprises DC power source 101, SSPC 102, feeder bus 103, reverse flow blocking diode 105, and motor controller 106, which is connected to a capacitive DC load. Once started, parallel arc fault 104 may not be extinguished without disconnecting the DC power source 101. In some embodiments, the reverse flow blocking diode 105 is not present in order to enable regenerative energy storage, which may improve aircraft fuel efficiency in embodiments in which DC power distribution system 100 is located in an aircraft. The energy stored in a DC link capacitor of the capacitive load connected to the motor controller 106 may contribute to arc fault 104 in embodiments in which reverse flow blocking diode 105 is not present.

Figure 2:
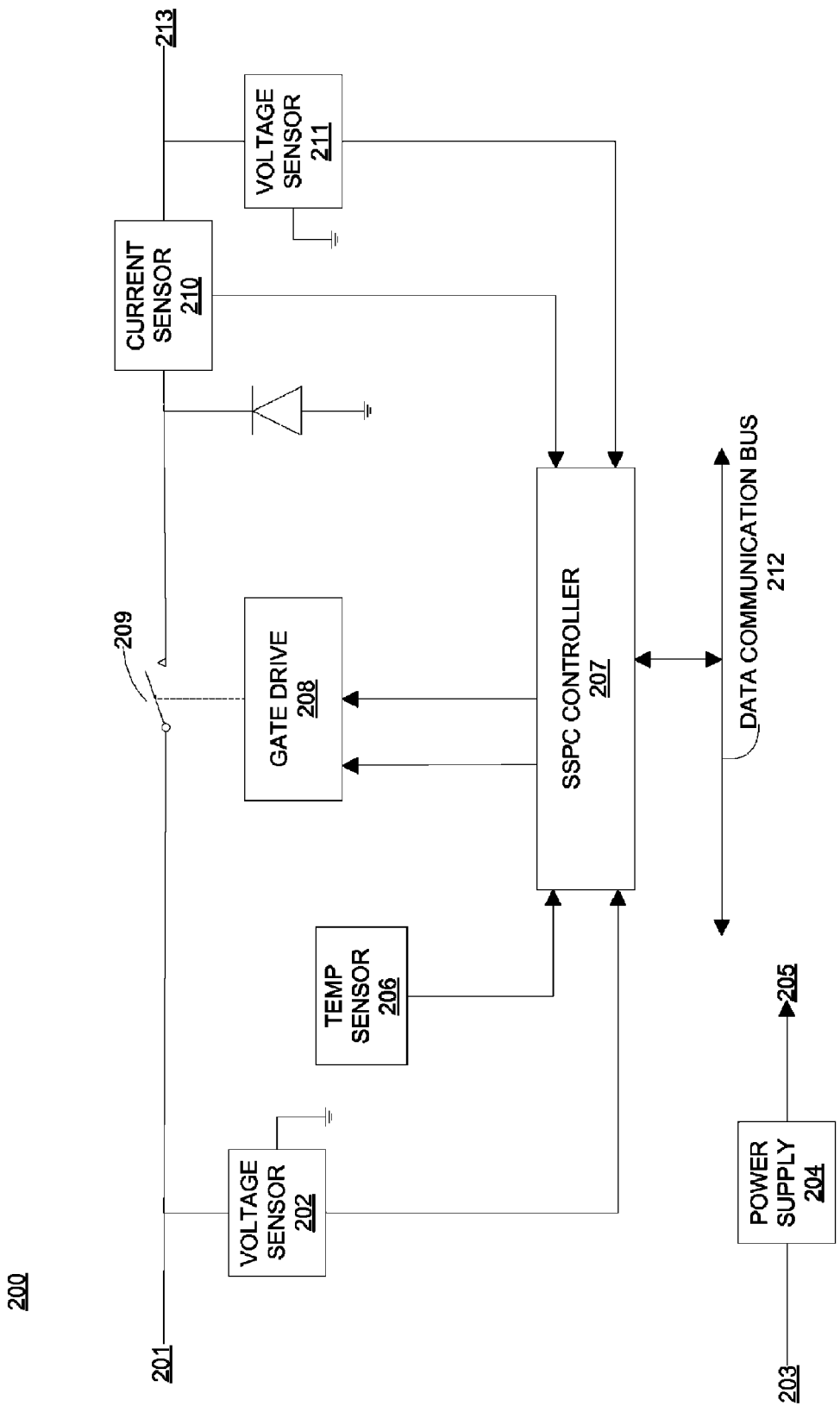
FIG. 2 illustrates an embodiment of an SSPC for parallel arc fault detection in a DC power distribution system.

FIG. 2 illustrates an embodiment of an SSPC 200 for arc fault detection, which may comprise SSPC 102 of FIG. 1. SSPC 200 receives input power at power input 201 from DC source 101 of FIG. 1, and powers motor controller 106 of FIG. 1 via power switch 209 (which is controlled by SSPC controller 207 via gate drive 208) and power output 213. SSPC controller 207 controls the gate-source voltage ($V_{GS}$) and On/Off of power switch 209 via gate drive 208 based on information from input voltage sensor 202, output voltage sensor 211, current sensor 210, temperature sensor 206, and data communication bus 212. Temperature sensor 206 allows SSPC controller 207 to protect SSPC 200 from overheating during operation. If the temperature data from temperature sensor 206 is over a predetermined threshold, SSPC 200 may announce an overtemperature trip and disable gate drive 208. SSPC controller 207 may comprise a DSP-based controller in some embodiments. The power switch 209 performs solid-state contactor functions and may comprise a silicon carbide (SiC) junction gate field effect transistor (JFET) in some embodiments, which may have relatively low insertion loss and a relatively fast switching response. The internal modules and sensors comprising SSPC 200 are powered by DC control power input 203 via internal power supply 204 and internal power supply output 205. During normal operation, the power switch 209 is turned-on, and the gate-source voltage ($V_{GS}$) of power switch 209 is set to a maximum value (about 3 volts DC in some embodiments) to enable minimum on-resistance of power switch 209.

Figure 3:
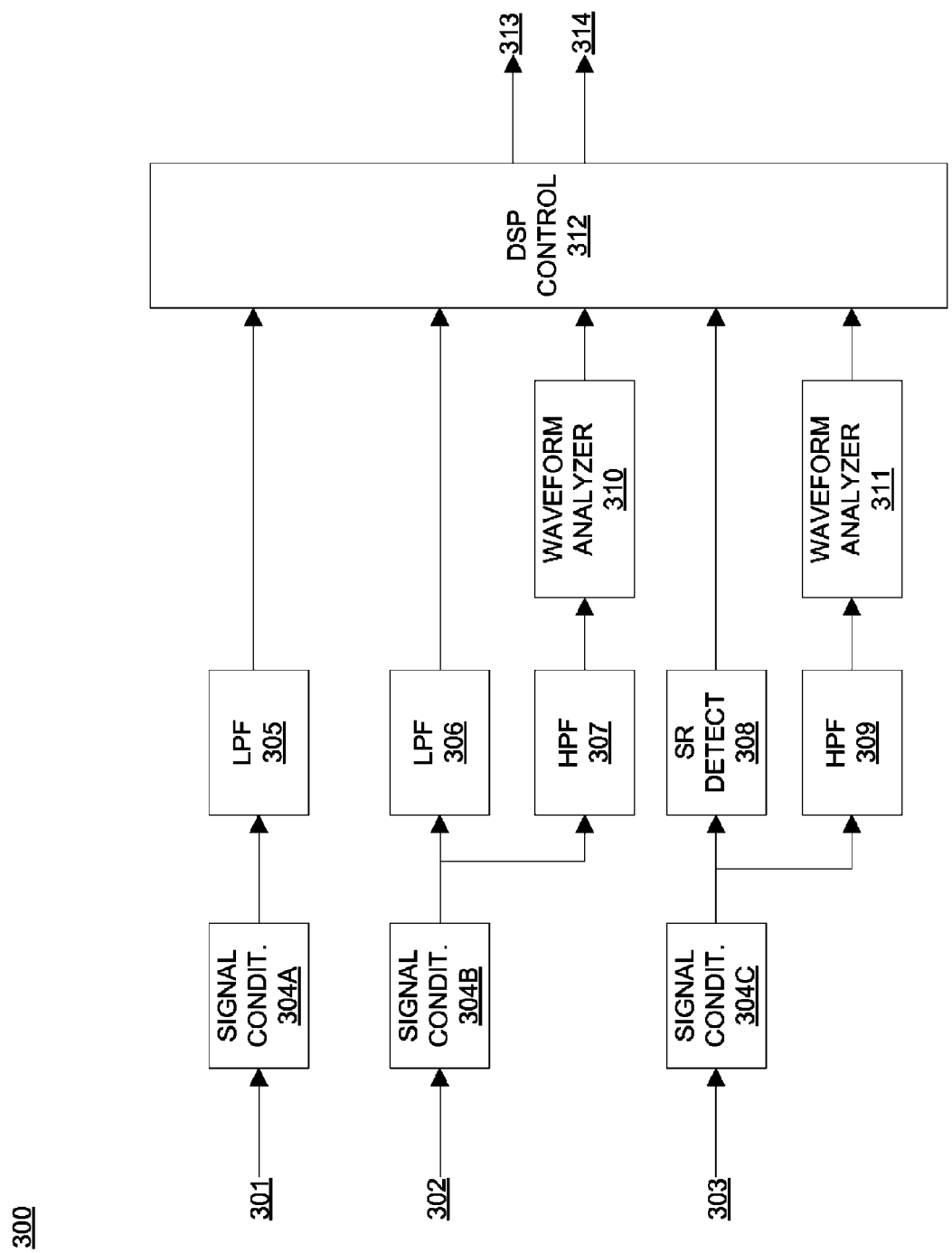
FIG. 3 illustrates an embodiment of an SSPC controller.

FIG. 3 illustrates an embodiment of an SSPC controller 300, which may comprise the SSPC controller 207 of FIG. 2. Input 301 receives the SSPC input voltage ($V_{dc\_in}$) from input voltage sensor 202 of FIG. 2; input 302 receives the SSPC output voltage ($V_{dc\_out}$) from output voltage sensor 211 of FIG. 2, and input 303 receives the SSPC output current ($I_{dc\_out}$) from current sensor 210 of FIG. 2. Gate drive 208 of FIG. 2 receives $V_{GS}$ and On/Off commands for power switch 209 from DSP controller 312 via outputs 313 and 314. The input values from each of inputs 301-303 are first sent through signal conditioning blocks 304A-C, respectively.

Signal conditioning block 304A converts $V_{dc\_in}$ from input 301 into a scaled signal to be used by the DSP controller 312 after low pass filter 305. The cutoff frequency of low pass filter 305 may be approximately 20 Hz. The DSP controller 312 enables operation of SSPC 200 if the input from input 201 is within a normal operating range per DC bus specifications; otherwise, SSPC 200 may be disabled.

Signal conditioning block 304B converts $V_{dc\_out}$ from input 302 into a scaled signal to be used in the DSP controller 312 after low pass filter 306. The cutoff frequency of low pass filter 306 may be approximately 20 Hz. The DSP controller 312 uses the conditioned $V_{dc\_out}$ signal in decision making block 404 (discussed below with respect to FIG. 4). The conditioned $V_{dc\_out}$ value from signal conditioning block 304B is also sent via high pass filter 307 and waveform analyzer 310 to DSP controller 312. The high pass filter 307 and waveform analyzer 310 act to detect non-stationary changes in $V_{dc\_out}$. The cutoff frequency of high pass filter 307 may be approximately 20 Hz. The waveform analyzer 310 may comprise a set of band pass filters with a bandwidth of up to 100 kHz in some embodiments. The DSP controller 312 compares the frequency spectrum of $V_{dc\_out}$ with a steady state components associated with the capacitive load 106 in block 407 (discussed below with respect to FIG. 4).

Signal conditioning block 304C converts $I_{dc\_out}$ from input 303 into a scaled signal to be used by the DSP controller 312 after slew rate detector 308. The parallel arc fault detection method of FIG. 4 uses the rate of change information from slew rate detector 308 of $I_{dc\_out}$ as compared with a threshold value in block 402 (discussed below with respect to FIG. 4). High pass filter 309 and waveform analyzer 311 act to detect non-stationary changes in the $I_{dc\_out}$. The cutoff frequency of high pass filter 309 may be approximately 20 Hz. The waveform analyzer 311 may comprise a set of band pass filters with the bandwidth of up to about 100 kHz. The DSP controller 312 compares the frequency spectrum of $I_{dc\_out}$ with a steady state components associated with the capacitive load 106 in block 407 (discussed below with respect to FIG. 4).

Figure 4:
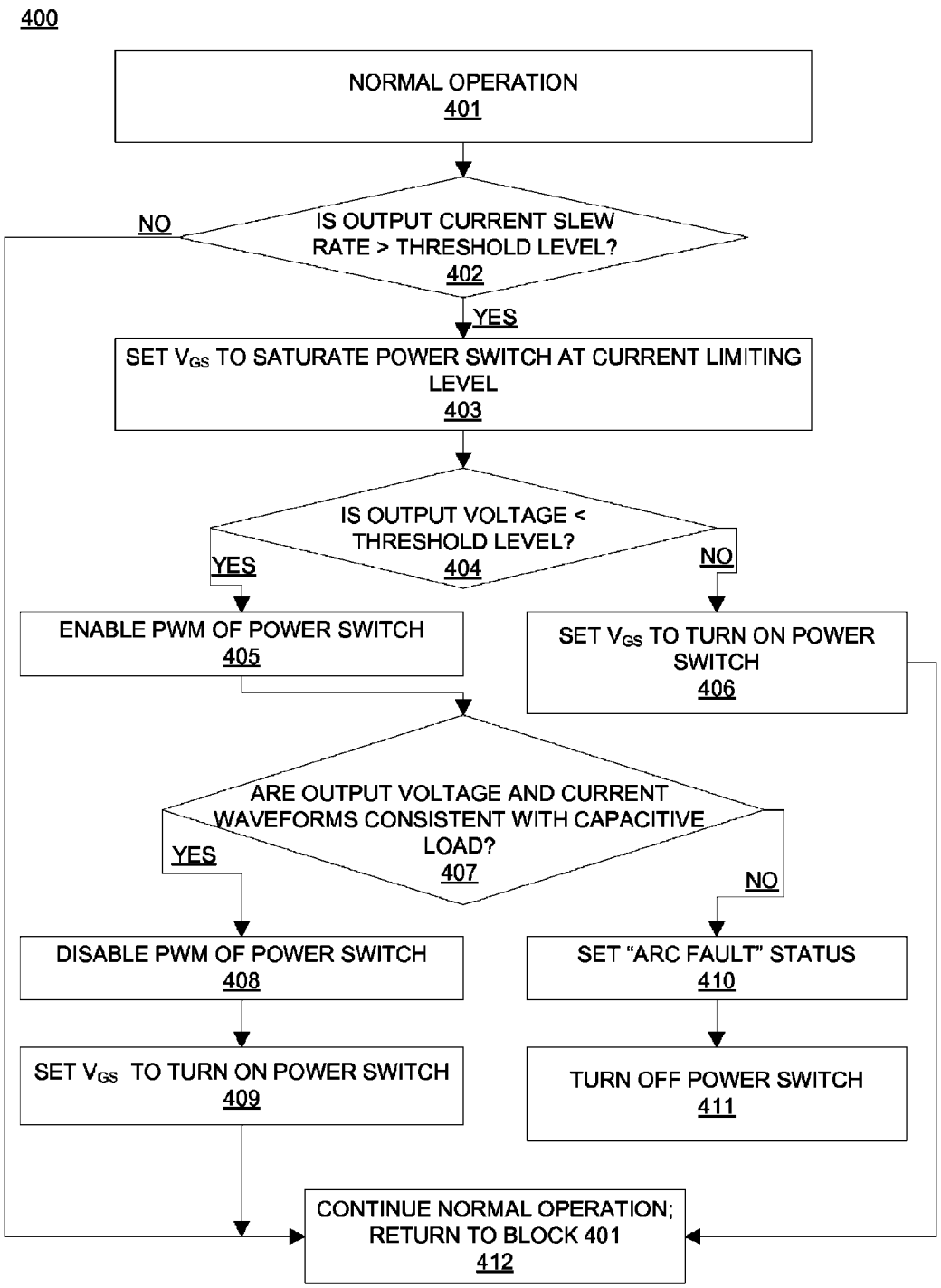
FIG. 4 illustrates a method of parallel arc fault detection using an SSPC in a DC power distribution system.

FIG. 4 illustrates a method for parallel arc fault detection that may be implemented in DSP control 312 of FIG. 3. In block 401, the SSPC operates normally, with the power switch 209 being turned-on, and the gate-source voltage ($V_{GS}$) set to a maximum value (3 Vdc in some embodiments) to allow minimum on-resistance of power switch 209. In block 402, it is determined if the slew rate of $I_{dc\_out}$ (from slew rate detector 308) is greater than a threshold level. If the $I_{dc\_out}$ value is not greater than the threshold level in block 402, flow ends at block 412. If the $I_{dc\_out}$ value is greater than the threshold level in block 402, the $V_{GS}$ of power switch 209 is set saturate the power switch 209 at a reduced voltage level and corresponding current limit in block 403. The saturation current limit may be selected based on the current rating of the load connected to motor controller 106 of FIG. 1, to avoid significant reduction of the performance of the load during parallel arc fault detection. Flow then proceeds to block 404. In block 404, it is determined if $V_{dc\_out}$ (from low pass filter 306) is less than a threshold level; this determination may be made within a specified time period. If $V_{dc\_out}$ is determined to be above the threshold level in block 404, $V_{GS}$ is returned to its maximum value for normal operation of power switch 209 in block 406, and flow then proceeds to end at block 412. If $V_{dc\_out}$ is less than the threshold level in block 404, pulse width modulation of power switch 209 at a specified switching frequency with a 50% duty cycle is enabled in block 405, and flow proceeds to block 407. In block 407, it is determined if the waveforms from waveform analyzers 310 and 311 are consistent with the capacitive load connected to motor controller 106 of FIG. 1, for example, the waveforms may comprise rectangular voltage and triangular current waveforms. If the waveforms from waveform analyzers 310 and 311 are determined to be consistent with the capacitive load in block 407, then, in block 408, pulse width modulation of switch 209 is disabled in block 408, $V_{GS}$ is returned to its maximum value for normal operation of power switch 209 in block 409, and flow proceeds to end at block 412. If the waveforms from waveform analyzers 310 and 311 are determined to be not consistent with the capacitive load in block 407, "parallel arc fault" status is set in block 410, and power switch 209 is turned off (opened) in block 411. The length of time to detect and confirm a parallel arc fault using method 400 may be limited based on the length of time that power switch 209 may operate at saturation before failure, to ensure acceptable load performance for the load attached to motor controller 106 of FIG. 1 during arc fault detection.

The technical effects and benefits of exemplary embodiments include relatively fast detection and stopping of parallel arc faults while avoiding nuisance trips by an SSPC in a DC power distribution system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for detecting a parallel arc fault by a solid state power controller (SSPC) in a direct current (DC) power distribution system, the method comprising:
    determining whether an output current slew rate from an output current sensor of the SSPC is above an output current slew rate threshold, and, in the event the output current slew rate is above the output current slew rate threshold:
        setting a power switch of the SSPC to saturation at a current limit; and
        determining whether an output voltage of the SSPC is below an output voltage threshold, and, in the event the output voltage is below the output voltage threshold:

enabling pulse width modulation of the power switch; and determining whether an output voltage waveform and a output current waveform of the SSPC are consistent with a capacitive load attached to an output of the SSPC, and, in the event the output voltage waveform and the output current waveform are not consistent with the capacitive load:
   issuing a parallel arc fault status; and
   turning off the power switch.

2. The method of claim 1, further comprising in the event the output voltage is not below the output voltage threshold, turning on the power switch at a maximum gate source voltage.

3. The method of claim 2, wherein the maximum gate source voltage is about 3 volts DC.

4. The method of claim 1, further comprising in the event the output voltage waveform and the output current waveform are consistent with the capacitive load:
   disabling pulse width modulation of the power switch; and
   turning on the power switch at a maximum gate source voltage.

5. The method of claim 1, wherein the power switch comprises a silicon carbide (SiC) junction gate field effect transistor (JFET).

6. The method of claim 1, wherein the saturation current limit is determined based on a current rating of the capacitive load.

7. The method of claim 1, wherein the pulse width modulation is performed at about a 50% duty cycle.

8. A solid state power controller (SSPC) for detecting a parallel arc fault in a direct current (DC) power distribution system, the SSPC comprising:
   an input, the input being connected to a DC power source;
   a power switch connected to the input;
   an output connected to the power switch, the output being connected to a DC motor controller and associated capacitive load;
   an output current sensor;
   an output voltage sensor; and
   an SSPC controller, the SSPC controller being configured to determine the presence of a parallel arc fault in the DC power distribution system and control the power switch via a gate drive based on inputs from the output current sensor and the output voltage sensor, wherein the SSPC controller comprises a slew rate detector configured to determine a slew rate of the input from the output current sensor; and wherein the SSPC controller is further configured to determine whether the slew rate is above an output current slew rate threshold, and, in the event the slew rate is above the output current slew rate threshold set the power switch to saturation at a current limit.

9. The SSPC of claim 8, wherein the saturation current limit is determined based on a current rating of the capacitive load.

10. The SSPC of claim 8, wherein the SSPC controller is further configured to determine whether the input from the output voltage sensor is below an output voltage threshold, and, in the event the input from the output voltage sensor is below the output voltage threshold, enable pulse width modulation of the power switch.

11. The SSPC of claim 10, wherein the pulse width modulation is performed at about a 50% duty cycle.

12. The SSPC of claim 10, wherein, in the event the input from the output voltage sensor is not below the output voltage threshold, the SSPC is configured to turn on the power switch at a maximum gate source voltage.

13. The SSPC of claim 12, wherein the maximum gate source voltage is about 3 volts DC.

14. The SSPC of claim 10, wherein the SSPC further comprises a first waveform analyzer configured to determine an output current waveform of the input from the output current sensor, and a second waveform analyzer configured to determine an output voltage waveform of the input from the output voltage sensor, and wherein the SSPC controller is further configured to determine whether the output voltage waveform and the output current waveform are consistent with the capacitive load, and, in the event the output voltage waveform and the output current waveform are not consistent with the capacitive load:
   issue a parallel arc fault status; and
   turn off the power switch.

15. The SSPC of claim 14, wherein, in the event the output voltage waveform and the output current waveform are consistent with the capacitive load, the SSPC is further configured to:
   disable pulse width modulation of the power switch; and
   turn on the power switch at the maximum gate source voltage.

16. The SSPC of claim 8, wherein the power switch comprises a silicon carbide (SiC) junction gate field effect transistor (JFET).

17. The SSPC of claim 8, wherein the SSPC controller comprises a digital signal processor (DSP).

* * * * *